United States Patent
Tong

(10) Patent No.: US 11,277,593 B2
(45) Date of Patent: Mar. 15, 2022

(54) TRANSMITTERS AND RECEIVERS FOR TRANSMISSION OF VIDEO AND OTHER SIGNALS BY FIBER OPTIC CABLE

(71) Applicant: Celerity Technologies Inc., Irvine, CA (US)

(72) Inventor: Xiaolin Tong, Irvine, CA (US)

(73) Assignee: Celerity Technologies Inc., Irvine, CA (US)

( * ) Notice: Subject to any disclaimer, the term of this patent is extended or adjusted under 35 U.S.C. 154(b) by 15 days.

(21) Appl. No.: 17/011,851

(22) Filed: Sep. 3, 2020

(65) Prior Publication Data

US 2021/0392301 A1 Dec. 16, 2021

Related U.S. Application Data

(63) Continuation-in-part of application No. 16/898,793, filed on Jun. 11, 2020.

(51) Int. Cl.
*H04N 7/22* (2006.01)
*H04N 7/167* (2011.01)
*H04B 10/2575* (2013.01)

(52) U.S. Cl.
CPC ......... *H04N 7/22* (2013.01); *H04B 10/25751* (2013.01); *H04N 7/167* (2013.01)

(58) Field of Classification Search
CPC ..... H04N 7/22; H04N 7/167; H04B 10/25751
See application file for complete search history.

(56) References Cited

U.S. PATENT DOCUMENTS

| 10,241,283 B1 * | 3/2019 | Shen ...................... H04B 10/40 |
| 2013/0046916 A1 * | 2/2013 | Dudemaine ............. H04N 7/22 710/317 |
| 2013/0236144 A1 * | 9/2013 | Tong .................... G02B 6/4401 385/89 |

* cited by examiner

*Primary Examiner* — Michael E Teitelbaum
(74) *Attorney, Agent, or Firm* — Chen Yoshimura LLP

(57) ABSTRACT

A video signal transmitter or receiver for handling multiple video signals, including mainboard signal processing circuitry, one master fiber module, and one or more add-on fiber modules. Video data signal for the multiple videos are transmitted over the master and add-on fiber modules, but no video control signal is transmitted over any add-on fiber module. Video control signal for all of the multiple videos are transmitted on a first subset of channels of the master fiber module in a multiplexed manner. The mainboard signal processing circuitry cooperates with the signal processing chip of the master fiber module to process all video control signals, with the master fiber module processing video control signals for at least two videos. Non-video signals are processed by the mainboard circuitry and transmitted on a second subset of channels of the master fiber module (same as or different from the first subset of channels).

21 Claims, 10 Drawing Sheets

TRANSMITTERS AND RECEIVERS FOR TRANSMISSION OF VIDEO AND OTHER SIGNALS BY FIBER OPTIC CABLE

BACKGROUND OF THE INVENTION

Field of the Invention

This invention relates to transmission of video and other signals by fiber optic cables, and in particular, it relates to transmitters and receivers used in transmission of video and other signals by fiber optic cables.

Description of Related Art

Fiber optic cables are widely used to transmit video, audio and other signal between video sources (such as video players, video signal switches, computers, etc.) and display devices (such as digital televisions, monitors, etc.). In addition to video signals, the signals transmitted between the video sources and display devices often include audio signals, data signals (such as USB (Universal Serial Bus) format data signals for peripheral devices), etc. The video signal typically complies with an industry-standard video transmission format such as HDMI (High Definition Multimedia Interface), DP (DisplayPort), DVI (Digital Visual Interface), VGA (Video Graphics Array), etc.

Some fiber optic transmitters and receivers, for example some such devices used in data centers, typical employ optical transceiver modules (referred to as fiber modules) that function to convert signals between optical signals and electrical signals. SFP (Small Form-factor Pluggable) fiber modules are a category of industry-standard, compact and hot-pluggable optical transceivers for such use. SFP fiber modules typically employ an industry-standard optical ribbon fiber connector for connecting to fiber optic cables, such as MPO (Multi-fiber Push On) connectors.

SUMMARY

The present invention is directed to an improved SFP fiber module that incorporates video signal processing functions, signal transmitters and receivers employing such improved fiber modules for supporting multiple video links, and video signal transmission methods implemented in such signal transmitters and receivers.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a video signal transmitter or receiver for transmitting or receiving a plurality of video signals, each video signal including video data signals and video control signals, the video signal transmitter or receiver including: a main circuit board; mainboard signal processing circuitry mounted on the main circuit board; a plurality of video signal connectors electrically coupled to the mainboard signal processing circuitry; and two or more fiber modules mounted on the main circuit board, including one master fiber module and one or more add-on fiber modules, each fiber module including: a casing having a size no greater than 75 mm by 20 mm by 15 mm; an optical fiber connector disposed in the casing; an optical transceiver disposed in the casing and optically coupled to the optical fiber connector, the optical transceiver having a plurality of channels and configured to convert between electrical signals and optical signals in each channel; and a signal processing chip disposed in the casing, electrically coupled to the optical transceiver and to the mainboard signal processing circuitry, and programmed to control the optical transceiver; wherein the mainboard signal processing circuitry is programmed to process and transmit the plurality of video signals between the video signal connectors and the two or more fiber modules, including to: divide the video data signals for the plurality of video signals into a plurality of subsets, and transmit or receive each subset of video data signals to or from one of the fiber modules, without transmitting or receiving any video control signal to or from any of the add-on fiber modules; transmit and receive video control signals for all of the plurality of video signals via a first subset of channels of the master fiber module, the video control signals being multiplexed on the first subset of channels; and cooperate with the signal processing chip of the master fiber module to process the video control signals for all of the plurality of video signals; and wherein the signal processing chip of the master fiber module is further programmed to process video control signals for at least two of the plurality of video signals.

In another aspect, the present invention provides a video signal transmission method for transmitting or receiving a plurality of video signals, each video signal including video data signals and video control signals, the method being implemented in a video signal transmitter or a video signal receiver, the video signal transmitter or video signal receiver including a mainboard signal processing circuitry, a plurality of video signal connectors electrically coupled to the mainboard signal processing circuitry, and two or more fiber modules, including one master fiber module and one or more add-on fiber modules, each fiber module including an optical fiber connector, an optical transceiver, and a signal processing chip electrically coupled to the mainboard signal processing circuitry, the video signal transmission method including: by the mainboard signal processing circuitry, dividing the video data signals for the plurality of video signals into a plurality of subsets, and transmitting or receiving each subset of video data signals to or from one of the fiber modules, without transmitting or receiving any video control signal to or from any of the add-on fiber modules; by the mainboard signal processing circuitry, transmitting and receiving video control signals for all of the plurality of video signals via a first subset of channels of the master fiber module, the video control signals being multiplexed on the first subset of channels; by the mainboard signal processing circuitry, cooperating with the signal processing chip of the master fiber module to process the video control signals for all of the plurality of video signals; and by the signal processing chip of the master fiber module, processing video control signals for at least two of the plurality of video signals.

In some embodiments, the step of the mainboard signal processing circuitry cooperating with the signal processing chip of the master fiber module to process the video control signals for all of the plurality of video signals includes: demultiplexing the video control signals received from the first subset of channels of the master fiber module into individual inbound video control signals for the plurality of video signals; transmitting the inbound video control signals for the at least two video signals to the master fiber module and receiving corresponding processed inbound video control signals from the master fiber module; processing all other ones of the inbound video control signals; transmitting all processed inbound video control signals respectively to corresponding ones of the video signal connectors; receiving outbound video control signals for the plurality of video signals from the corresponding video signal connectors; transmitting the outbound video control signals for the at least two video signals to the master fiber module and receiving corresponding processed outbound video control signals from the master fiber module; processing all other ones of the outbound video control signals; and multiplexing all processed outbound video control signals and transmitting the multiplexed signals to the first subset of channels of the master fiber module.

In some embodiments, the mainboard signal processing circuitry and the signal processing chip of the master fiber module process each of the respective video control signals in compliance with a video transmission format selected from a group consisting of (1) HDMI (High Definition Multimedia Interface), where the video control signals include SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals, (2) DP (DisplayPort), where the video control signals include AUX (Auxiliary) and HPD signals, and (3) DVI (Digital Visual Interface), where the video control signals include DDC and HPD signals.

In some embodiments, the video signal transmitter or receiver further includes one or more non-video signal connectors electrically coupled to the mainboard signal processing circuitry; and wherein the mainboard signal processing circuitry further processes and transmits one or more non-video signals between the non-video signal connectors and a second subset of channels of the master fiber module.

In some embodiments, the one or more non-video signals include one or more signals selected from a group consisting of audio signals, data signals for a peripheral device, network signals, RS-232 signals, and IR remote control signals, and the one or more non-video signal connectors include one or more connectors selected from a group consisting of USB (Universal Serial Bus) connectors, Ethernet connectors, and RS-232 connectors.

In some embodiments, the second subset of channels of the master fiber module are the same as the first subset of channels of the master fiber module. In some other embodiments, the second subset of channels of the master fiber module are different from the first subset of channels of the master fiber module.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
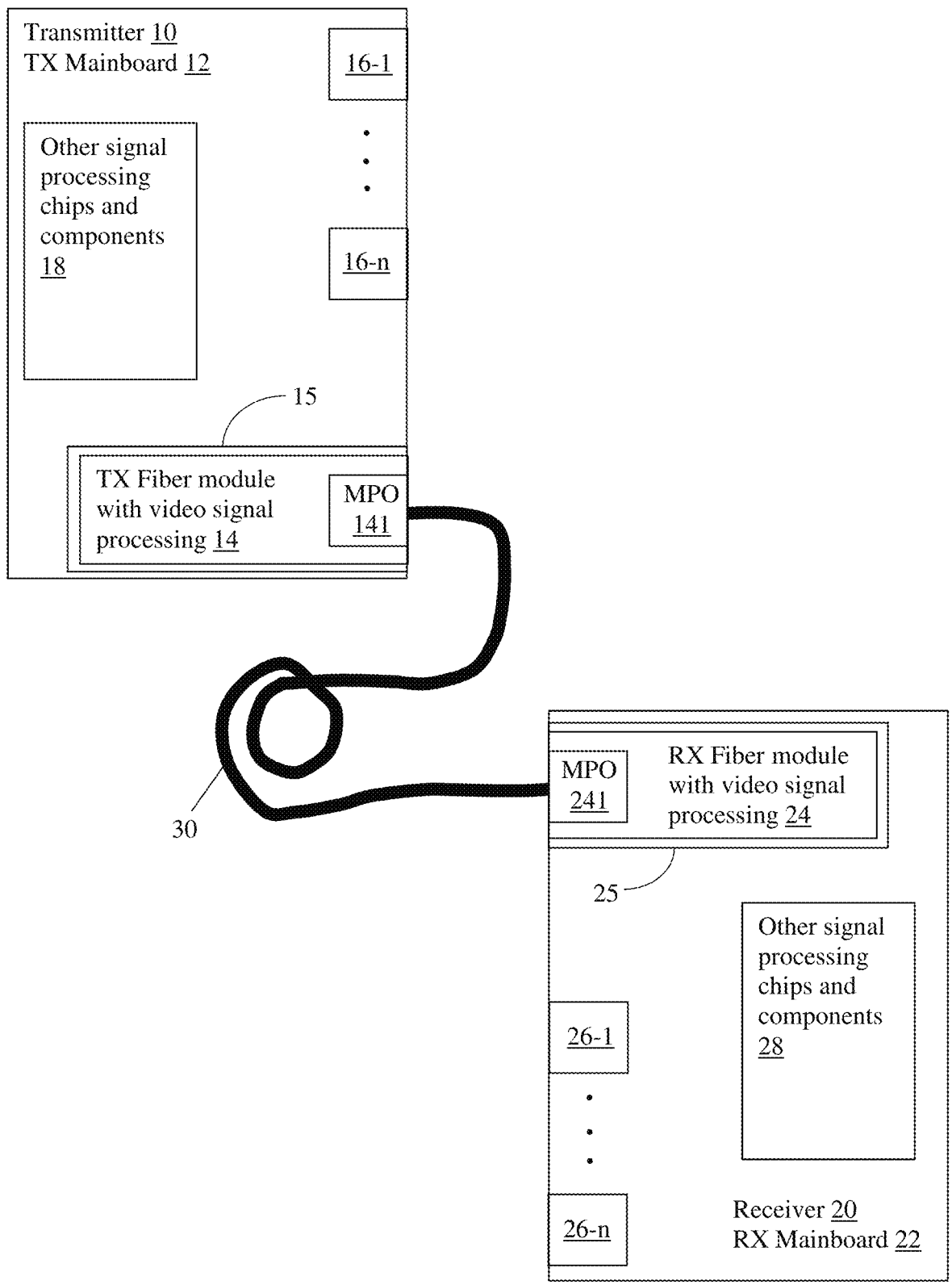
FIG. 1 schematically illustrates a signal transmission system including a signal transmitter for a video source and a signal receiver for a display device connected by a fiber optic cable according to an embodiment of the present invention.

FIG. 1 schematically illustrates a signal transmission system for video and other signals according to an embodiment of the present invention. The system includes a signal transmitter 10 adapted to be installed in or connected to a video source, and a signal receiver 20 adapted to be installed in or connected to a display device, the signal transmitter and signal receiver being connected to each other by a fiber optic cable 30. The video source (not shown) may be, for example, a video player, a computer, a video signal switch, etc.; the display device (not shown) may be, for example, a digital TV, a computer monitor, a flat panel display, a projector, etc. Note that although the device 10 at the video source end is referred to as a signal transmitter and the device 20 at the display device end is referred to as a signal receiver, signal transmission between them is bi-directional. The fiber optic cable 30 is preferably equipped with standard optical ribbon fiber connectors such as MPO connectors at both ends.

The signals transmitted over the fiber optic cable 30 between the transmitter 10 and receiver 20 may include multimedia video signals, audio signals, data signals (such as USB-format signals for data related to keyboard, mouse, thumb drive, hard drive, computer camera, and/or other peripheral devices), network signals (data signals communicated to or from the video source or display device over a network such as Ethernet), RS-232 signals (data signals communicated to or from the video source or display device over an RS-232 cable), IR remote control signals (electrical signals generated by or for an infrared-based remote control component of the video source or the display device), etc. In many embodiments, the fiber optic cable 30 transmit these signals between the transmitter 10 and receiver 20 over a long distance such as 100 ft to 1000 ft or even longer, with a high bandwidth e.g. over 40 Gbps, thus enabling multi-function extension of the transmission capability using fiber optic links. The transmitter 10 and receiver 20 are not linked by any other cables, and all signals are transmitted over the fiber optic cable 30.

The signal transmitter 10 has a main circuit board (transmitter mainboard) 12 on which various components are mounted, including a transmitter fiber module 14 with a standard optical fiber connector 141 for connecting with the fiber optic cable 30, multiple external electrical signal connectors 16-1 to 16-$n$ (such as USB, Ethernet, RS-232, etc. connectors, and a video signal connector), and various other components 18 including signal processing chips and other components for various supporting functions, electrically coupled to each other. Similarly, the signal receiver 20 has a main circuit board (receiver mainboard) 22 on which various components are mounted, including a receiver fiber module 24 with a standard optical fiber connector 241 for connecting with the fiber optic cable 30, multiple external electrical signal connectors 26-1 to 26-$n$ (such as USB, Ethernet, RS-232, etc. connectors, and a video signal connector), and various other components 28 including signal processing chips and other components for various supporting functions, electrically coupled to each other. The mainboards 12 and 22 may be, for example, printed circuit bards (PCBs).

Each of the transmitter fiber module 14 and receiver fiber module 24 has a form factor that complies with the requirements of the SFP (Small Form-factor Pluggable) standard for fiber modules so that it can be plugged into or unplugged from the respective mainboards 12 and 22. Unlike conventional SFP fiber modules, however, each of the transmitter fiber module 14 and receiver fiber module 24 includes a signal processing chip that performs video signal processing functions. In conventional transmitters and receivers adapted for video sources and display devices, all electrical signal processing functions for video, audio and data signals are performed by chips mounted on the mainboard. A conventional fiber module, which has an optical transceiver (including light emitting devices, e.g. laser diodes, and light detecting devices, e.g. photodiodes) configured to perform electrical-to-optical and optical-to-electrical signal conversions, only performs electrical signal processing related to control of the optical transceiver, and is not capable of performing video signal processing.

In embodiments of the present invention, the transmitter fiber module 14 and the receiver fiber module 24 perform the following video signal processing functions: for HDMI, processing of SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals; for DVI, processing of DDC and HPD signals; for DisplayPort, processing of AUX (Auxiliary channel) and HPD signals. The transmitter and receiver mainboards 12 and 22 do not have signal processing chips that perform any of the video signal processing functions listed above, and merely route the video signals for the transmitter fiber module 14 and receiver fiber module 24, respectively. On the other hand, the transmitter fiber module 14 and receiver fiber module 24 do not perform any electrical signal processing functions for the non-video signals such as audio, USB data, network, RS-232, IR remote control, etc. signals; these non-video signals are processed by other signal processing chips on the mainboards, and the transmitter and receiver fiber modules only performs electrical-optical signal conversion for them. Noted here that "audio signal" refers to audio signals that are separate from the multimedia video signal which itself may contain audio; here, the audio signal may be signals from a computer's microphone, for example.

This separation of the location of video signal processing from non-video signal processing allows the same transmitter fiber module 14 (or receiver fiber module 24) to be alternatively plugged into different transmitter mainboards 12 (or receiver mainboards 22), or different transmitter fiber modules (or receiver fiber modules) to be alternatively plugged into the same transmitter mainboard (or receiver mainboard), to accomplish desired combinations of signal processing functions to suit different applications. For example, each transmitter fiber module 14 and receiver fiber module 24 is preferably designed to perform video signal processing required for one particular video transmission standard, such as HDMI, DP, DVI, etc.; suitable transmitter and receiver fiber modules may be chosen for a particular system depending on the transmission format of the video signal. As another example, different transmitter and receiver mainboards may be equipped with different non-video signal processing functions (for example, if USB signal processing is not needed for the system, the mainboards may omit related signal processing components to reduce cost); suitable mainboards may be chosen to be used with the transmitter and receiver fiber modules depending on the system and application need. These various combinations are possible because different transmitter fiber modules 14 and receiver fiber modules 24 have the same standard form factor, and different transmitter mainboards 12 and receiver mainboards 22 have the same standard slots that accommodate the transmitter and receiver fiber modules. Further, transmitter fiber modules and receiver fiber modules may even be employed alone, without the mainboards, for video-only applications.

Figure 2:
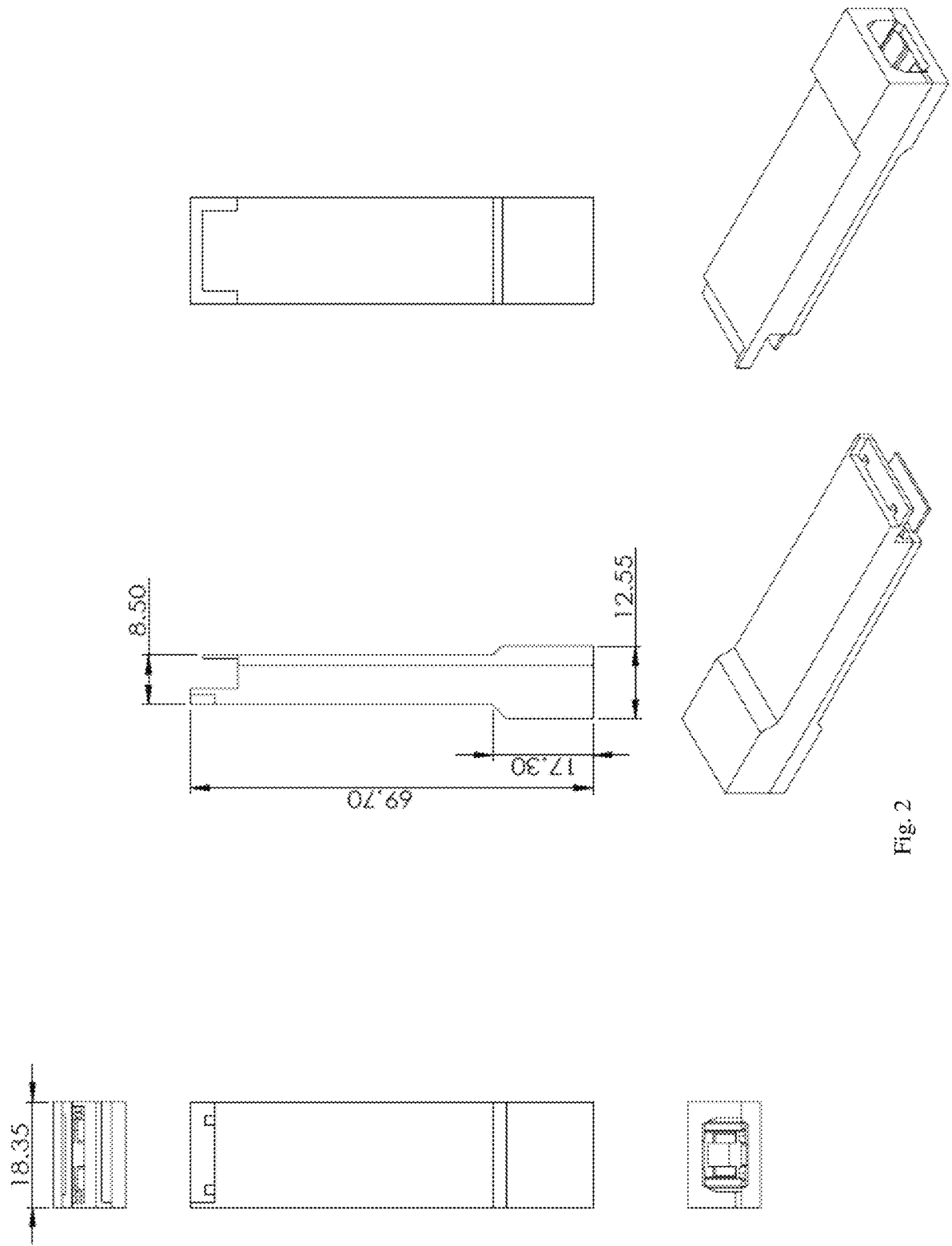
FIG. 2 shows side and perspective views of a transmitter fiber module or receiver fiber module with video signal processing functions according to embodiments of the present invention.
Figure 3:
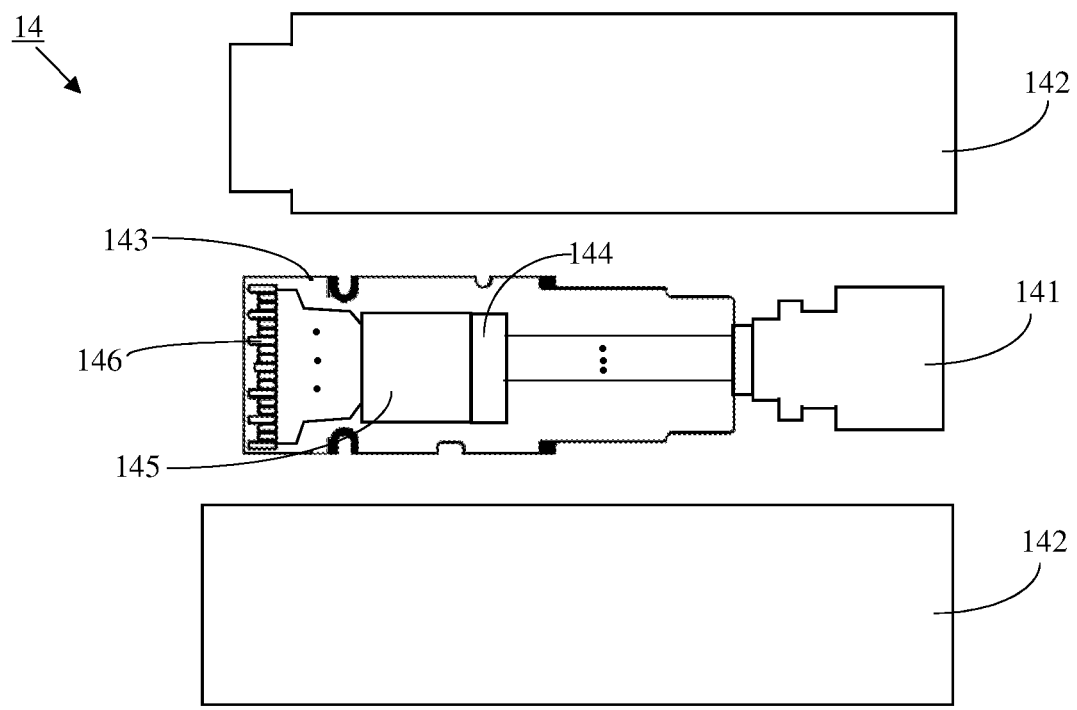
FIG. 3 show the structure of the transmitter fiber module or receiver fiber module with video signal processing functions according to embodiments of the present invention.

The transmitter fiber module 14 and receiver fiber module 24 have the same structure except for their video signal processing functions. The descriptions below, with reference to FIGS. 2 and 3, apply to both transmitter and receiver fiber modules (simply referred to as the fiber module). FIG. 2 shows various exterior side views and perspective views of the fiber module, and FIG. 3 shows an unassembled fiber module. As shown in FIG. 2, the fiber module has an exterior shape that approximates an elongated rectangular box (slightly thicker at the front end), where the two smaller dimensions define the front end face of the fiber module that accommodates a standard optical fiber connector, for example, an MPO connector for a specified number of optical fibers. Preferably, the fiber module has an external form factor that complies with the requirements of the SFP standard. In one specific example, as shown in FIG. 2, the fiber module has a size of approximately 69.70 mm by 18.35 mm by 12.55 mm. More generally, the fiber module has a size smaller than 75 mm by 20 mm by 15 mm.

As shown in FIG. 3, the fiber module 14 has top and bottom covers 142 (e.g. metal covers) which, when assembled together, forms a casing having the form factor described above. A circuit board 143 and an optical fiber connector 141 connected to the circuit board are disposed between the covers when assembled. The optical fiber connector 141 is preferably a standard connector, such as an MPO connector, which can accommodate multi-fiber cables and is equipped with a snap to retain the cable. Other optical fiber connectors may also be used. An optical transceiver 144 and a signal processing chip 145 are mounted on the circuit board 143. The optical transceiver 144, which is coupled to the optical fiber connector 141 and the signal processing chip 145, has light emitting devices (e.g. laser diodes) and light detecting devices (e.g. photodiodes) configured to perform electrical-to-optical and optical-to-electrical signal conversions, respectively. A plurality of electrical signal pins 146 are formed at the back end of the circuit board 143 and are exposed by the covers when assembled. The physical locations and the number of pins 146 comply with the SFP fiber module standard, but the signals transmitted by the pins are different from those in conventional fiber modules. The signal processing chip 145 is programmed to carry out the above-described video signal processing functions. The chip 145 is also programmed to perform control functions to control the optical transceiver. In a preferred embodiment, the signal processing chip 145 is a ¼ inch by ¼ inch sized chip. The signal processing chips in the transmitter fiber module and receiver fiber module are programmed to perform different video signal processing functions as noted earlier.

Referring back to FIG. 1, in the signal transmitter 10, a fiber module mounting frame 15 is mounted on the transmitter mainboard 12, and is sized and shaped to accommodate the fiber module 14 plugged into it. A number of pins are located in the fiber module mounting frame 15 and coupled to the mainboard 12, and configured to form electrical connections with the electrical signal pins 146 at the back end of the fiber module 14 to couple electrical signals between the mainboard and the fiber module. Suitable mechanical structures such as snaps are provided in the fiber module mounting frame 15 to securely retain the fiber module 14 within the mounting frame, while allowing the fiber module to be easily unlocked and removed from the frame. This way, the fiber module 14 can be easily plugged into and unplugged from the signal transmitter 10, which enhances service flexibility.

Similarly, the signal receiver 20 has a fiber module mounting frame 25 mounted on the receiver mainboard 22 to accommodate the receiver fiber module 24. Note that because the fiber modules 14 and 24 have a form factor, including the pin number and locations, that complies with industry standards for fiber modules, the fiber module mounting frames 15 and 25 may have the same structure as those used with conventional fiber modules.

In use, the signal transmitter 10 is installed in or connected to a video source, and the signal receiver 20 is installed in or connected to a display device. The transmitter fiber module 14 is plugged into the signal transmitter 10, and the receiver fiber module 24 is plugged into the signal receiver 20. The fiber optic cable 30 is routed through the desired space (e.g., from one room to another) and plugged into the transmitter fiber module 14 and the receiver fiber module 24.

As noted earlier, although the device 10 at the video source end is referred to as a signal transmitter and the device 20 at the display device end is referred to as a signal receiver, signal transmission between them is bi-directional. They may have generally similar structures in terms of the external electrical signal connectors and various support components, although their signal processing chips are programmed to perform different functions. Therefore, both the signal transmitter 10 and signal receiver 20 may be more generally referred to as signal transmission devices, where their respective fiber modules may be more generally referred to as fiber modules.

Figure 4:
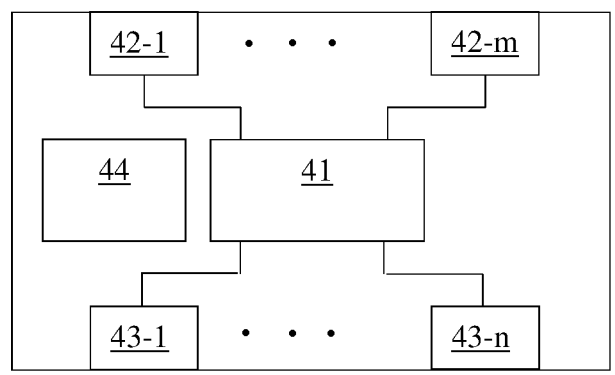
FIG. 4 schematically illustrates a video switch employing the transmitter fiber module according to another embodiment of the present invention.

FIG. 4 schematically illustrates a video switching device employing fiber modules with video signal processing functions, according to another embodiment of the present invention. The video switching device 40 includes a video matrix switch 41, such as a 4×4 or an 8×8 matrix switch, connected to multiple (e.g. 4 or 8) video source connectors 42-1 to 42-*m*, each adapted to be connected to a video source, and multiple (e.g. 4 or 8) display device connectors 43-1 to 43-*n*, each adapted to be connected to a display device. The video matrix switch 41 selectively couples each video source connector to one or more display device connectors. The video switching device 40 further includes various signal processing chips 44 and other components (not shown). The video switching device 40 may include other external electrical signal connectors, such as USB, RS-232, etc. connectors (not shown).

Each of the display device connectors 43-1 to 43-*n* has the same structure as the transmitter fiber module 14 described earlier. That is, each display device connector includes a signal processing chip configured to perform video signal processing, an optical transceiver, and a standard optical fiber connector, all disposed between two covers that define a form factor complying with the requirements of the SFP standard for fiber modules. The video switching device 40 does not have any other components that perform video signal processing functions. The signal processing chips 44 of the video switching device 40 only perform signal processing functions for non-video signals.

In some embodiments, multiple fiber module mounting frames, similar to the fiber module mounting frame 15 described earlier, may be provided on a circuit board of the video switching device 40 to accommodate corresponding display device connectors (transmitter fiber modules). Thus, different display device connectors with different video signal processing functions (e.g. for different video transmission standards) may be plugged into and unplugged from the video switching device 40.

The video switching device 40 may be used, for example, to output multiple video signals to a large display system formed of multiple flat panel displays, or to multiple monitors at different locations for a video conference, etc.

Figure 5:
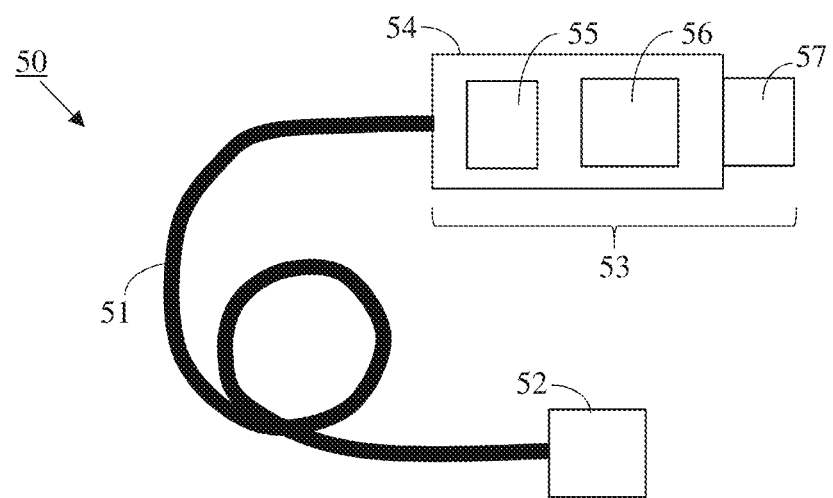
FIG. 5 schematically illustrates a fiber optic cable device with integrated optical transceiver and video signal processing chip according to another embodiment of the present invention.

FIG. 5 schematically illustrates a fiber optic cable device 50 with integrated optical transceiver and video signal processing chip according to another embodiment of the present invention. The fiber optic cable device 50 includes a cable 51 containing a plurality of optical fibers, with an optical fiber connector 52 at one end and an electrical signal connector module 53 at the other end. The optical fiber connector 52 is preferably a standard optical ribbon fiber connector, such as an MPO connector.

The electrical signal connector module 53 includes, within a casing 54, an optical transceiver 55 and a signal processing chip 56 mounted on a circuit board. The optical transceiver 55 and signal processing chip 56 have similar structures and functions as the optical transceiver 144 and signal processing chip 145 of the fiber module 14 described earlier. In particular, the signal processing chip 56 is preferably a ¼ inch by ¼ inch chip programmed to perform video signal processing functions described above for the signal processing chip 145. The size of the casing 54 is no greater than 10 mm by 20 mm by 45 mm. The electrical signal connector module 53 further includes an electrical signal connector 57 that protrudes from the casing 54, which preferably complies with a video transmission standard such as HDMI, DP, DVI, etc.

Figure 6:
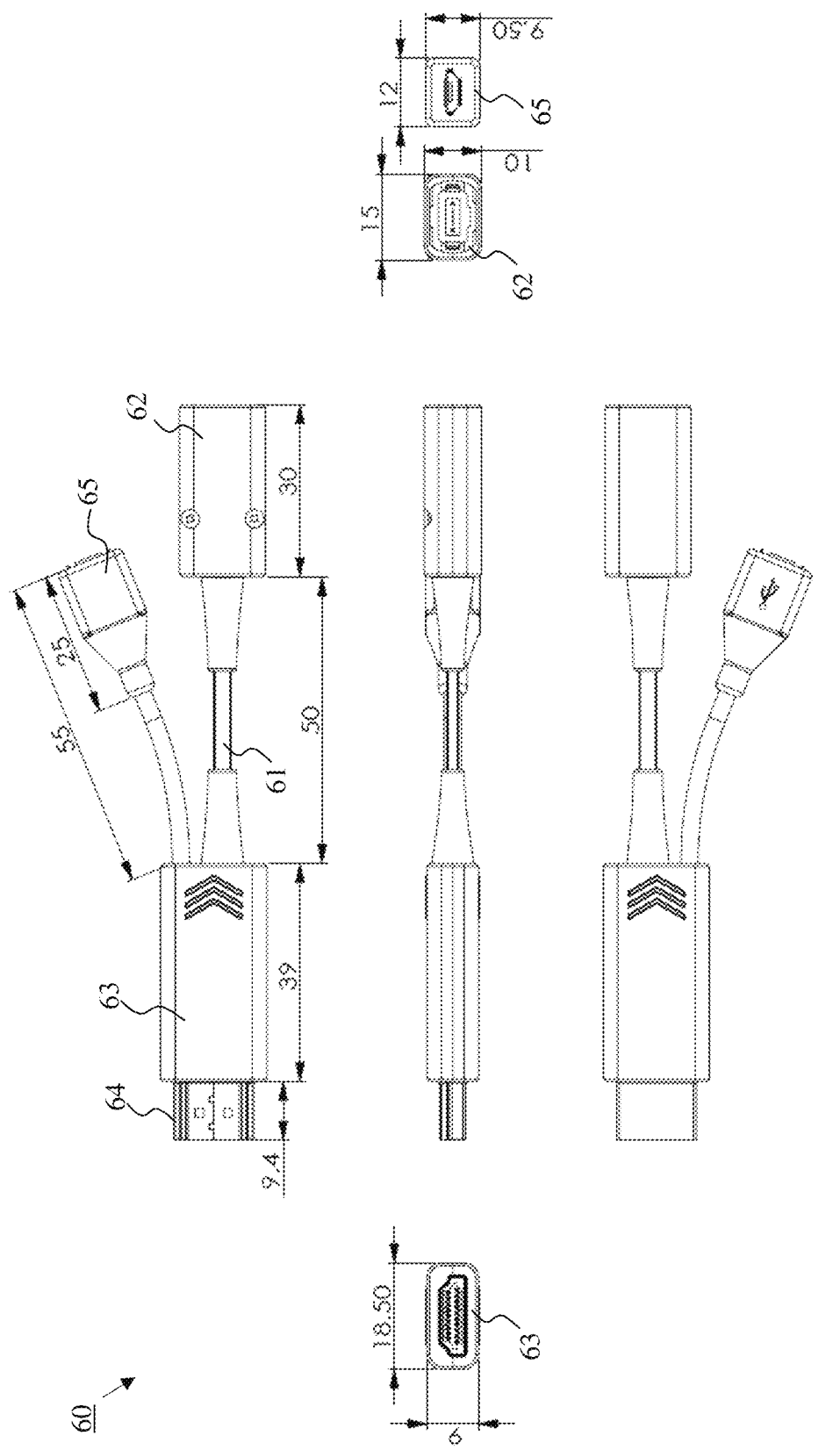
FIG. 6 schematically illustrates a fiber optic cable adapter with integrated optical transceiver and video signal processing chip according to another embodiment of the present invention.

FIG. 6 schematically illustrates a fiber optic cable adapter 60 with integrated optical transceiver and video signal processing chip according to another embodiment of the present invention. The fiber optic cable adapter 60 includes short cable 61 containing a plurality of optical fibers, with an optical fiber connector 62 at one end and an electrical signal connector module 63 at the other end. The optical fiber connector 62 is preferably a standard optical ribbon fiber connector, such as an MPO connector.

The electrical signal connector module 63 has a structure similar to that of the electrical signal connector module 53 described earlier (the internal structure of the electrical signal connector module 63 is not illustrated in FIG. 6). That is, the electrical signal connector module 63 includes, within a casing, an optical transceiver and a signal processing chip mounted on a circuit board. The optical transceiver and signal processing chip have similar structures and functions as the optical transceiver 144 and signal processing chip 145 of the fiber module 14 described earlier. In particular, the signal processing chip is preferably a ¼ inch by ¼ inch chip programmed to perform video signal processing functions described above for the signal processing chip 145. The size of the casing of the electrical signal connector module 63 is no greater than 10 mm by 20 mm by 45 mm. In the illustrated embodiment, the size of the casing is 9 mm by 18.5 mm by 39 mm. The electrical signal connector module 63 further includes an electrical signal connector 64 that protrudes from the casing, which preferably complies with a video transmission standard such as HDMI, DP, DVI, etc.

A USB connector 65 is also connected to the electrical signal connector module 63, located at the same end of the module as the cable 61. The USB connector 65 is coupled to the internal circuitry of the electrical signal connector module 63, including the signal processing chip and/or the electrical signal connector. The USB port may have the following functions: First, to supply power to the electrical signal connector module 63; and second, to provide data transfer for keyboard, mouse, touch screen, and/or UART (universal asynchronous receiver-transmitter) data between a computer (e.g. a server) and a display device (e.g. a monitor).

To summarize, various embodiments of the present invention have a common feature where a module smaller than 75 mm by 20 mm by 15 mm integrates a standard optical fiber connector or video signal connector, an optical transceiver, and a signal processing chip programmed to perform video signal processing functions including processing the SCL, SDA, CEC, HPD and ARC signals for HDMI, processing the DDC and HPD signals for DVI, and processing the AUX and HPD signals for DisplayPort. Such a module may have the form factor of a conventional fiber module with a standard optical fiber connector and be used as a part of a signal transmitter or signal receiver or a video switch, providing greater service flexibility. Such a module may also form a part of a fiber optic cable device with a standard video signal connector.

The above embodiments may be expanded so that one fiber module carries (transmits or receives) multiple video signals. A fiber module with a standard MPO connector has twelve channels (optical fibers). To carry only one video signal, six of these channels are used, including four for uncompressed video data signals and two for video control signals and non-video signals (e.g. audio, USB data, network, RS-232, IR remote control, etc.). In this disclosure, for convenience, "video data signals" refers to the signals that represent video image data, such as: in HDMI and DVI, the TMDS (Transition-Minimized Differential Signaling) data 0 to 2 and clock; and in DP, the main links ML_Lane 0 to 3. "Video control signals" refers to the control signals that are part of the video signal, such as: in HDMI, the SCL, SDA, CEC, HPD, and ARC signals; in DVI, the DDC and HPD signals; and in DP, the AUX and HPD signals.

In alternative embodiments, more of the fiber module channels may be used to support additional video signals. For example, two uncompressed video signals may be carried using a total of ten channels, with four channels allocated to the video data signals of each video signals and two channels total allocated to the video control signals of the two video signals in a multiplexed manner (e.g., using time domain multiplexing). For compressed video signals, a twelve-channel fiber module may carry ten video signals, with one channel allocated to the video data signal of each video signal and two channels total allocated to the ten sets of video control signals in a multiplexed manner. A signal transmitter or receiver employing such a fiber module may be used to transmit or receive video signals for a large display system formed of multiple display devices. In these situations, the signal processing chip within the fiber module performs video signal processing for the two or more video signals. In some cases, for example to handle ten video signals, a larger chip may be used or multiple chips may be used. Alternatively, the signal processing chip within the fiber module may cooperate with signal processing chips on the main circuit board to process all of the video signals.

A signal transmitter or receiver employing such a fiber module may be used to transmit or receive video signals for a display system formed of multiple displays, such as a video wall.

In further alternative embodiments, the transmitter and receiver may employ multiple fiber modules to carry multiple uncompressed video signals in a distributed and scalable manner, as described below.

Figure 7:
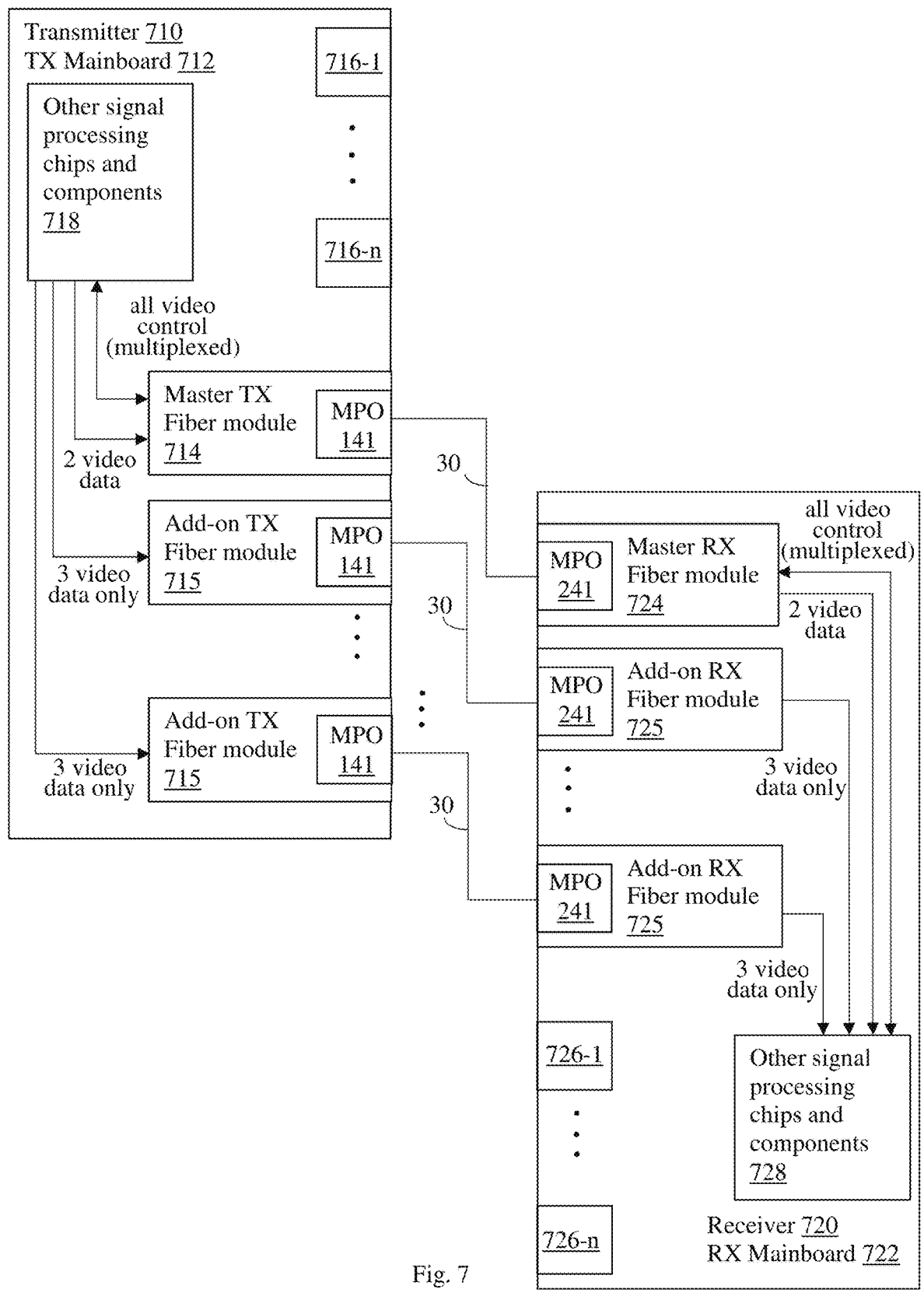
FIG. 7 schematically illustrates a signal transmission system for multiple videos and other signals according to another embodiment of the present invention.

FIG. 7 schematically illustrates a signal transmission system for multiple videos and other signals according to an embodiment of the present invention. The system includes a signal transmitter 710 adapted to be connected to multiple video sources or be installed as a part of a larger equipment, and a signal receiver 720 adapted to be connected to multiple display devices or be installed as a part of another larger equipment, the signal transmitter and signal receiver being connected to each other by multiple fiber optic cables 30. The system can transmit multiple video signals between the signal transmitter and the signal receiver.

The signal transmitter 710 is similar to the signal transmitter 10 shown in FIG. 1, with the following differences: multiple transmitter fiber modules 714 and 715 are provided on the main circuit board (transmitter mainboard) 712, each having a physical structure similar to the transmitter fiber module 14 described in earlier embodiments, but their signal processing chips are programmed to perform different signal processing functions as will be described in more detail later. The signal processing functions of the signal processing circuitry 718 (e.g. one or more chips) on the mainboard 712 are also different from those of the mainboard components 18. Further, the electrical signal connectors 716-1 to 716-n includes multiple video signal connectors, in addition to USB, Ethernet, etc. connectors. Note that these signal connectors may be internal wirings if the signal transmitter is a part of a larger equipment. All fiber modules 714 and 715 and electrical signal connectors 716-1 to 716-n are electrically coupled to the mainboard signal processing circuitry 718.

Likewise, the signal receiver 720 is similar to the signal receiver 20 shown in FIG. 1, with the following differences: multiple receiver fiber modules 724 and 725 are provided on the main circuit board (receiver mainboard) 722, each having a physical structure similar to the receiver fiber module 24, but their signal processing chips are programmed to perform different signal processing functions as will be described in more detail later. The signal processing functions of the signal processing circuitry 728 (e.g., one or more chips) on the mainboard 722 are also different from those of the mainboard components 28. Further, the electrical signal connectors 726-1 to 726-n includes multiple video signal connectors, in addition to USB, Ethernet, etc. connectors. Note that these signal connectors may be internal wirings if the signal transmitter is a part of a larger equipment. All fiber modules 724 and 725 and electrical signal connectors 726-1 to 726-n are electrically coupled to the mainboard signal processing circuitry 728. Note that the fiber module mounting frames (15 and 25 in FIG. 1) are omitted in FIG. 7 for simplicity.

The transmitter fiber modules include one master transmitter fiber module 714 and one or more add-on transmitter fiber modules 715. The master transmitter fiber module 714 is configured to transmit video data signals of two uncompressed video signals on eight (four for each video) of its twelve channels. For convenience, these two video signals are referred to as the first two (or the first and second) video signals in this disclosure. Each add-on transmitter fiber module 715 is configured to transmit video data signals for up to three additional uncompressed video signals on its twelve channels. The add-on transmitter fiber modules 715 do not carry any video control signals; instead, all video control signals, for both the first two and the additional video signals, are multiplexed onto two (or four) of the remaining channels of the master transmitter fiber module 714. For convenience, these two (or four) channels of the master transmitter fiber module are referred to as the control signal channels in this disclosure. Video signal processing functions (i.e., processing of the video control signals) for all video signals are shared by the mainboard chips 718 and the signal processing chip of the master transmitter fiber module 714. The signal processing chips of the add-on transmitter fiber modules 715 do not perform any video signal processing function.

Non-video signals (e.g. audio, USB data, network, RS-232, IR remote control, etc.) are also carried on the control signal channels of the master transmitter fiber module 714. The non-video signals may be multiplexed together with the video control signals onto the same control signal channels, or the non-video signals and the video control signals may be separately multiplexed onto different control signal channels (e.g., two channels each).

Similar to the signal transmitter 710, the signal receiver 720 has one master receiver fiber module 724 and one or more add-on receiver fiber modules 725. The multiple video signals are allocated to the master and add-on receiver fiber modules 724 and 725 in the same manner as in the signal transmitter 710. Each receiver fiber module 724 or 725 is connected to a corresponding transmitter fiber module 714 or 715 by a fiber optic cable 30. Video signal processing functions for all video signals are shared by the mainboard chips 728 and the signal processing chip of the master receiver fiber module 724. The signal processing chips of the add-on receiver fiber modules 725 do not perform any video signal processing function.

The number of add-on fiber modules on each side may depend on the number of video signals to be supported by the system. For example, a total of two fiber modules (one master, one add-on) on each side can transmit up to five uncompressed video signals, a total of three fiber modules (one master, two add-ons) can transmit up to eight uncompressed video signals, etc. Also, the number of video signal connectors (e.g. HDMI ports, DP ports, etc.) among the signal connectors 716-1 to 716-$n$ and 726-1 to 726-$n$ should be at least the same as the maximum number of video signals that the system supports.

As mentioned earlier, the video signal processing functions for the multiple video signals are performed by the mainboard chips 718 (or 728) and the signal processing chip of the master transmitter (or receiver) fiber module 714 (or 724). In one example, the signal processing chip of the master fiber module 714 or 724 performs video signal processing for the first two video signals, and the mainboard chips 718 or 728 perform video signal processing for all the additional video signals. Other manners of sharing the video signal processing load may be adopted, without limitation to any particular sharing scheme. For example, the master fiber module 714 or 724 may perform video signal processing for two video signals other than the first two video signals, or the master fiber module may perform video signal processing for more than two video signals.

The video signal processing operations are described in more detail with reference to FIGS. 8A and 8B. Note that as video control signals are generally bi-directional, the signal processing flows described in FIGS. 8A and 8B apply to both the signal transmitter 710 and the signal receiver 720. For convenience of description, the control signals received from the other side via fiber optic cable may be referred to as inbound and control signals transmitted to the other side via the fiber optic cable may be referred to as outbound. The handling of video data signals is not shown in FIGS. 8A and 8B, but shown in FIGS. 9A (for transmitter) and 9B (for receiver).

Figure 8A:
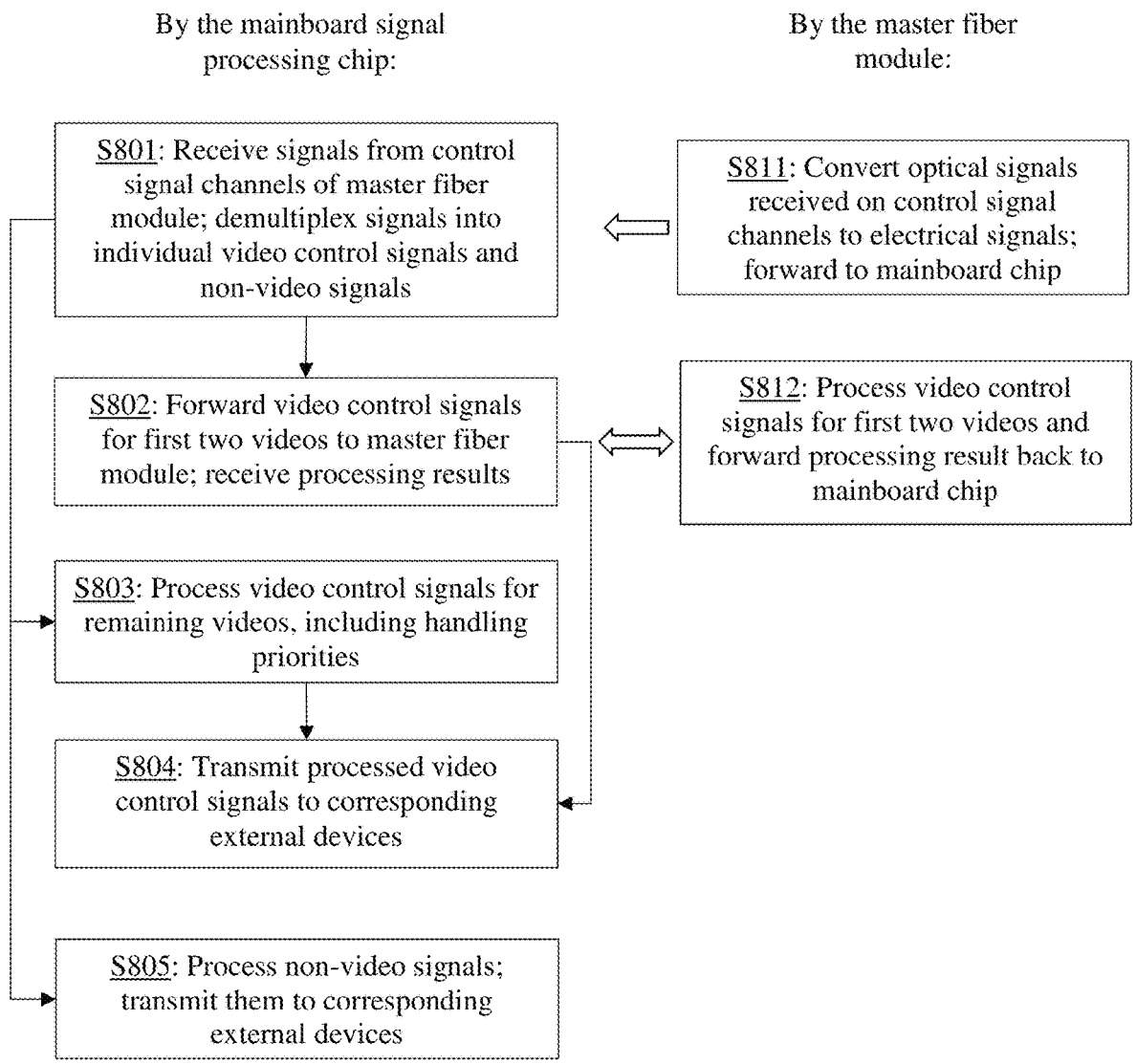
FIGS. 8A, 8B, 9A and 9B are flowcharts that illustrate the operation methods of the signal transmission system of FIG. 7.

Referring to FIG. 8A, when the master fiber module 714/724 receives inbound optical signals on its two (or four) control signal channels, it converts them to electrical signals and forwards the electrical signals to the mainboard signal processing chip 718/728 (step S811). The mainboard chip demultiplexes the received signals to obtain individual video control signals as well as non-video signals (step S801). The mainboard chip forwards the video control signals for the first two video signals to the master fiber module (step S802). The signal processing chip of the master fiber module processes the video control signals for the first two video signals, and forwards the processing result back to the mainboard chip (step S812).

Meanwhile, the mainboard chip processes the video control signals for all the remaining (additional) video signals (step S803). In this step, preferably, the mainboard chip handles processing priorities among the various video control signals to ensure timely processing of all video control signals and avoid lost of signals or other undesirable effects caused by untimely processing. Consider, for example, the signals SCL, SDA, CEC, HPD and ARC for HDMI: at any giving time, some signals will get a response within ns time range, some may allow response time in 10 ns, 100 ns or 1000 ns ranges. The mainboard chip takes all situations into consideration and arranges the processing sequences accordingly. During actual video transmission, it is possible that some signals are not timely processed; thus, the mainboard chip monitors the lost signals in order to reset the handshaking with the other side when necessary. Based on errors during the process, the priority sequences may be adjusted to award the successful choices when conflicts end without lost of data. Then, the mainboard chip transmits the processed inbound video control signals (including the ones received back from the master fiber module) to appropriate external devices (display devices or video sources), for example, via corresponding electrical signal connectors or other wirings (step S804).

The mainboard chip also processes the non-video signals obtained by demultiplexing, and transmits them to appropriate external devices, for example, via corresponding electrical signal connectors or other wirings (step S805).

Figure 8B:
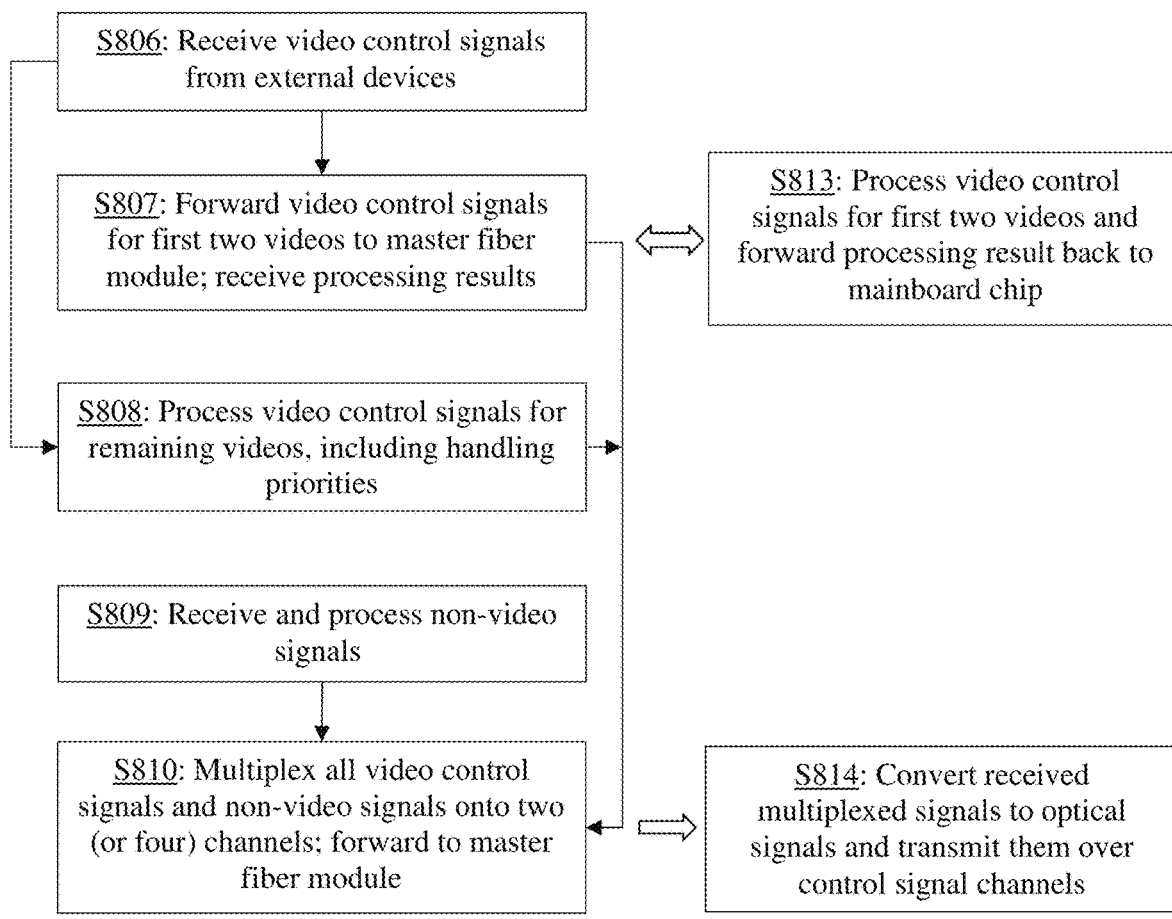

Referring to FIG. 8B, when the mainboard chip 718/728 receives outbound video control signals from the external devices (display devices or video sources) (step S806), it forwards the video control signals for the first two video signals to the master fiber module 714/724 (step S807). The signal processing chip of the master fiber module processes the video control signals for the first two video signals, and forwards the processing result back to the mainboard chip (step S813).

Meanwhile, the mainboard chip processes the video control signals for all the remaining (additional) video signals (step S808). In this step, preferably, the mainboard chip handles processing priorities among the various video control signals, as described earlier, to ensure timely processing of all video control signals and avoid lost of signals or other undesirable effects caused by untimely processing.

The mainboard chip also processes non-video signals received from external devices (step S809). The mainboard chip then multiplexes (e.g., by time domain multiplexing) all processed video control signals, including those received back from the master fiber module, as well as the non-video signals, onto two (or four) signal channels, and forward the multiplexed signals to the master fiber module (step S810). As mentioned earlier, the video control signals and the non-video signals may be multiplexed together or separately. The master fiber module converts the received multiplexed signals to optical signals and transmits them over its control signal channels (step S814).

Figure 9A:
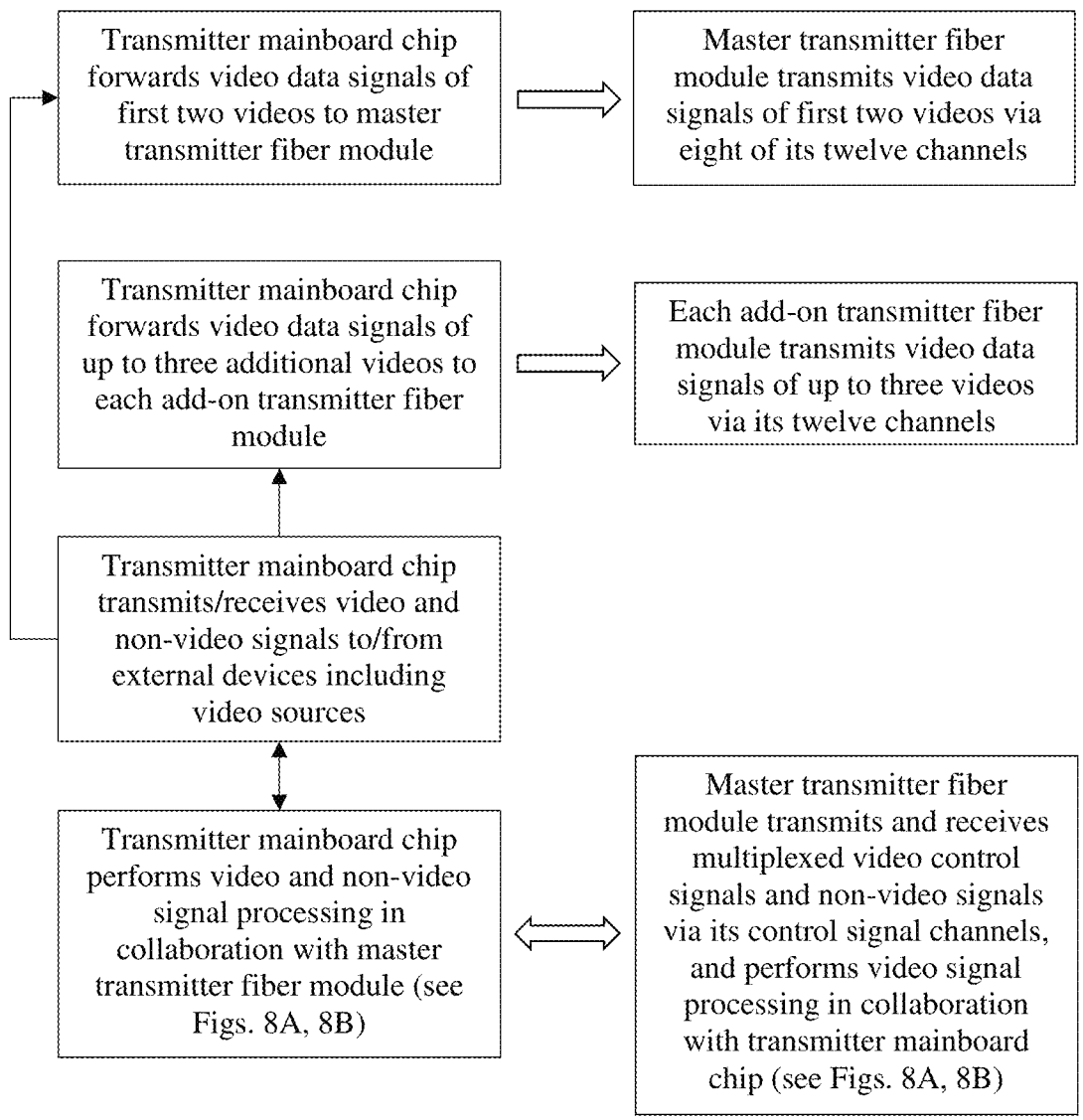
Figure 9B:
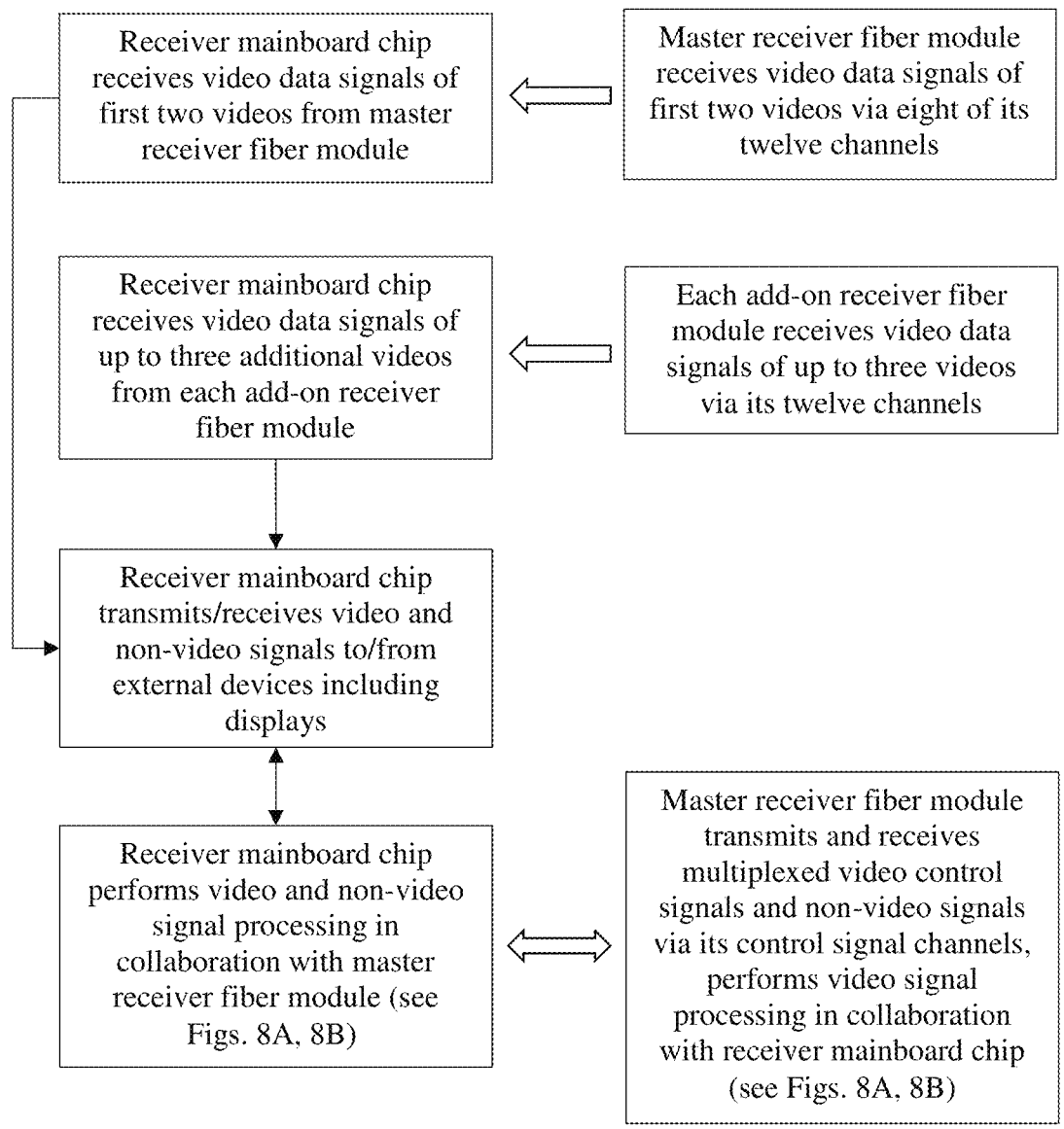

FIGS. 9A and 9B schematically summarize the overall signal processing and transmission steps in the signal transmitter 710 and signal receiver 720, respectively. Details have been explained above.

A multi-channel signal transmission system according to the embodiment of FIGS. 7-9B has many efficiency and cost-saving advantages. One advantage is that all channels of the add-on fiber modules can be allocated to video data signals, because these fiber modules do not need to carry video control signals. Another advantage is that the video control signals for all of the multiple video signals, as well as the non-video signals, can be processed in only a few signal processing chips including the chip in the master fiber module and one or more mainboard chips.

Another advantage is flexibility and scalability. The transmitter 710 and receiver 720 are provided with a number of fiber module mounting frames and a number of video signal connectors based on the designed maximum number of video signals to be supported. For example, three fiber module mounting frames and eight video signal connectors may be provided to support a maximum of eight video signals, or five fiber module mounting frames and fourteen video signal connectors may be provided to support a maximum of fourteen video signals, etc. But the actual number of add-on fiber modules installed in the transmitter and receiver may be fewer than the maximum, depending on practical need (note that the master fiber module is always installed). This provides meaningful cost savings: because a major cost component of the system is associated with the optical transceivers (lasers and photodetectors) in the fiber modules, omitting unneeded fiber modules can save cost. On the other hand, electrical signal connectors are inexpensive, so unused electrical signal connectors are only minimally wasteful. This way, the system is scalable, as more video signals may be supported by a given system by installing more add-on fiber modules. In addition, any given add-on fiber modules may have fewer than twelve fibers and twelve optical transceivers, if fewer than three video signals are to be carried by that module. This further saves cost.

Although fiber modules with twelve channels are used as examples in the above descriptions, the embodiment may be implemented with fiber modules that have other numbers of channels, using the same principles described above.

Although in the examples described above the multiple video signals are all transmitted in one direction (from 710 to 720), the system may alternatively transmit some of the multiple video signals in one direction and some of the multiple video signals in the opposite direction. Such a system may be implemented in the same way as described above except that the transmission directions of the some of the video data signals is from device 720 to device 710, and that in both devices 710 and 720, the video control signals processed by the mainboard signal processing circuitry and the master fiber module include video control signals for video signals of both directions. In such a system, both devices 710 and 720 are transmitter/receiver devices. Using such a system, for example, three video links may be configured as two video links from device 710 to device 720 and one video link from device 720 to device 710.

Although in the examples described above, all non-video signals from the electrical signal connectors are multiplexed onto two (or four) channels of the master fiber module, in alternative embodiments, some non-video signals may be transmitted over dedicated channels of one or more fiber modules. For example, USB-C, USB 4 and thunderbolt ports each have four lines of signal going in the same direction; these four signals may be transmitted over four dedicated channels of a fiber module (master or add-on), in a similar manner as a four-channel video data signal for HDMI, DP or DVI. Thus, such a system can support applications that use USB-C, USB4 or thunderbolt signals.

It will be apparent to those skilled in the art that various modification and variations can be made in the fiber modules incorporating video signal processing functions, and related signal transmitter, signal receiver, video switch, and fiber optic cable device of the present invention without departing from the spirit or scope of the invention. Thus, it is intended that the present invention cover modifications and variations that come within the scope of the appended claims and their equivalents.

What is claimed is:

1. A video signal transmitter or receiver for transmitting or receiving a plurality of video signals, each video signal including video data signals and video control signals, the video signal transmitter or receiver comprising:
   a main circuit board;
   mainboard signal processing circuitry mounted on the main circuit board;
   a plurality of video signal connectors electrically coupled to the mainboard signal processing circuitry; and
   two or more fiber modules mounted on the main circuit board, including one master fiber module and one or more add-on fiber modules, each fiber module including:
      a casing;
      an optical fiber connector disposed in the casing;
      an optical transceiver disposed in the casing and optically coupled to the optical fiber connector, the optical transceiver having a plurality of channels and configured to convert between electrical signals and optical signals in each channel; and
      a signal processing chip disposed in the casing, electrically coupled to the optical transceiver and to the mainboard signal processing circuitry, and programmed to control the optical transceiver;
   wherein the mainboard signal processing circuitry is programmed to process and transmit the plurality of video signals between the video signal connectors and the two or more fiber modules, including to:
      divide the video data signals for the plurality of video signals into a plurality of subsets, and transmit or receive each subset of video data signals to or from one of the fiber modules, without transmitting or receiving any video control signal to or from any of the add-on fiber modules;
      transmit and receive video control signals for all of the plurality of video signals via a first subset of channels of the master fiber module, the video control signals being multiplexed on the first subset of channels; and cooperate with the signal processing chip of the master fiber module to process the video control signals for all of the plurality of video signals; and wherein the signal processing chip of the master fiber module is further programmed to process video control signals for at least two of the plurality of video signals.

2. The video signal transmitter or receiver of claim 1, wherein the mainboard signal processing circuitry is programmed to cooperate with the signal processing chip of the master fiber module to process the video control signals for all of the plurality of video signals by:

demultiplexing the video control signals received from the first subset of channels of the master fiber module into individual inbound video control signals for the plurality of video signals;

transmitting the inbound video control signals for the at least two video signals to the master fiber module and receiving corresponding processed inbound video control signals from the master fiber module;

processing all other ones of the inbound video control signals;

transmitting all processed inbound video control signals respectively to corresponding ones of the video signal connectors;

receiving outbound video control signals for the plurality of video signals from the corresponding video signal connectors;

transmitting the outbound video control signals for the at least two video signals to the master fiber module and receiving corresponding processed outbound video control signals from the master fiber module;

processing all other ones of the outbound video control signals; and multiplexing all processed outbound video control signals and transmitting the multiplexed signals to the first subset of channels of the master fiber module.

3. The video signal transmitter or receiver of claim 1, wherein the mainboard signal processing circuitry and the signal processing chip of the master fiber module are programmed to process each of the respective video control signals in compliance with a video transmission format selected from a group consisting of (1) HDMI (High Definition Multimedia Interface), where the video control signals include SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals, (2) DP (DisplayPort), where the video control signals include AUX (Auxiliary) and HPD signals, and (3) DVI (Digital Visual Interface), where the video control signals include DDC and HPD signals.

4. The video signal transmitter or receiver of claim 1, further comprising one or more non-video signal connectors electrically coupled to the mainboard signal processing circuitry;

wherein the mainboard signal processing circuitry is further programmed to process and transmit one or more non-video signals between the non-video signal connectors and a second subset of channels of the master fiber module.

5. The video signal transmitter or receiver of claim 4, wherein the one or more non-video signals include one or more signals selected from a group consisting of audio signals, data signals for a peripheral device, network signals, RS-232 signals, and IR remote control signals, and the one or more non-video signal connectors include one or more connectors selected from a group consisting of USB (Universal Serial Bus) connectors, Ethernet connectors, and RS-232 connectors.

6. The video signal transmitter or receiver of claim 4, wherein the second subset of channels of the master fiber module are the same as the first subset of channels of the master fiber module.

7. The video signal transmitter or receiver of claim 4, wherein the second subset of channels of the master fiber module are different from the first subset of channels of the master fiber module.

8. The video signal transmitter or receiver of claim 1, further comprising a non-video signal connector electrically coupled to the mainboard signal processing circuitry, the non-video signal connector being selected from a group consisting of a USB-C (Universal Serial Bus-C) connector, a USB4 connector, and a thunderbolt connector;

wherein the mainboard signal processing circuitry is further programmed to process and transmit non-video signals between the non-video signal connectors and either the master fiber module or one of the add-on fiber modules.

9. The video signal transmitter or receiver of claim 1, wherein each of the plurality of fiber modules has an exterior shape and electrical signal pins that comply with a SFP (Small Form-factor Pluggable) standard.

10. The video signal transmitter or receiver of claim 1, wherein the optical fiber connector of each of the plurality of fiber modules is an MPO (Multi-fiber Push On) connector.

11. The video signal transmitter or receiver of claim 1, wherein the video signal processing chip of each of the plurality of fiber modules has a size of ¼ inch by ¼ inch.

12. The video signal transmitter or receiver of claim 1, further comprising two or more fiber module mounting frames mounted on the main circuit board, each fiber module mounting frame having a size and a shape configured to accommodate one of the two or more fiber modules, wherein each fiber module is configured to be plugged into and unplugged from one of the two or more fiber module mounting frames.

13. A video signal transmission method for transmitting or receiving a plurality of video signals, each video signal including video data signals and video control signals, the method being implemented in a video signal transmitter or receiver, the video signal transmitter or receiver including a mainboard signal processing circuitry, a plurality of video signal connectors electrically coupled to the mainboard signal processing circuitry, and two or more fiber modules, including one master fiber module and one or more add-on fiber modules, each fiber module including an optical fiber connector, an optical transceiver, and a signal processing chip electrically coupled to the mainboard signal processing circuitry, the video signal transmission method comprising:

by the mainboard signal processing circuitry, dividing the video data signals for the plurality of video signals into a plurality of subsets, and transmitting or receiving each subset of video data signals to or from one of the fiber modules, without transmitting or receiving any video control signal to or from any of the add-on fiber modules;

by the mainboard signal processing circuitry, transmitting and receiving video control signals for all of the plurality of video signals via a first subset of channels of the master fiber module, the video control signals being multiplexed on the first subset of channels;

by the mainboard signal processing circuitry, cooperating with the signal processing chip of the master fiber module to process the video control signals for all of the plurality of video signals; and by the signal processing chip of the master fiber module, processing video control signals for at least two of the plurality of video signals.

14. The video signal transmission method of claim 13, wherein the step of cooperating with the signal processing chip of the master fiber module to process the video control signals for all of the plurality of video signals includes:

demultiplexing the video control signals received from the first subset of channels of the master fiber module into individual inbound video control signals for the plurality of video signals;

transmitting the inbound video control signals for the at least two video signals to the master fiber module and receiving corresponding processed inbound video control signals from the master fiber module;

processing all other ones of the inbound video control signals;

transmitting all processed inbound video control signals respectively to corresponding ones of the video signal connectors;

receiving outbound video control signals for the plurality of video signals from the corresponding video signal connectors;

transmitting the outbound video control signals for the at least two video signals to the master fiber module and receiving corresponding processed outbound video control signals from the master fiber module;

processing all other ones of the outbound video control signals; and multiplexing all processed outbound video control signals and transmitting the multiplexed signals to the first subset of channels of the master fiber module.

15. The video signal transmission method of claim 13, wherein the mainboard signal processing circuitry and the signal processing chip of the master fiber module process each of the respective video control signals in compliance with a video transmission format selected from a group consisting of (1) HDMI (High Definition Multimedia Interface), where the video control signals include SCL ($I^2C$ serial clock for DDC (Display Data Channel)), SDA ($I^2C$ serial data for DDC), CEC (Consumer Electronics Control), HPD (Hot Plug Detect), and ARC (Audio Return Channel) signals, (2) DP (DisplayPort), where the video control signals include AUX (Auxiliary) and HPD signals, and (3) DVI (Digital Visual Interface), where the video control signals include DDC and HPD signals.

16. The video signal transmission method of claim 13, wherein the video signal transmitter or receiver further includes one or more non-video signal connectors electrically coupled to the mainboard signal processing circuitry, the method further comprising:

by the mainboard signal processing circuitry, processing and transmit one or more non-video signals between the non-video signal connectors and a second subset of channels of the master fiber module.

17. The video signal transmission method of claim 16, wherein the one or more non-video signals include one or more signals selected from a group consisting of audio signals, data signals for a peripheral device, network signals, RS-232 signals, and IR remote control signals, and the one or more non-video signal connectors include one or more connectors selected from a group consisting of USB (Universal Serial Bus) connectors, Ethernet connectors, and RS-232 connectors.

18. The video signal transmission method of claim 16, wherein the second subset of channels of the master fiber module are the same as the first subset of channels of the master fiber module.

19. The video signal transmission method of claim 16, wherein the second subset of channels of the master fiber module are different from the first subset of channels of the master fiber module.

20. The video signal transmission method of claim 13, wherein the video signal transmitter or receiver further includes a non-video signal connector electrically coupled to the mainboard signal processing circuitry, the non-video signal connector being selected from a group consisting of a USB-C (Universal Serial Bus-C) connector, a USB4 connector, and a thunderbolt connector, the method further comprising:

by the mainboard signal processing circuitry, processing and transmitting non-video signals between the non-video signal connectors and either the master fiber module or one of the add-on fiber modules.

21. The video signal transmitter or receiver of claim 1, wherein the casing has a size no greater than 75 mm by 20 mm by 15 mm.

* * * * *